United States Patent
Kawagoe et al.

(10) Patent No.: US 6,802,649 B2
(45) Date of Patent: Oct. 12, 2004

(54) SLIDING BEARING

(75) Inventors: Kimio Kawagoe, Aichi (JP); Hiroshi Ito, Aichi (JP); Toru Desaki, Aichi (JP); Yasuaki Goto, Aichi (JP); Yoshio Fuwa, Aichi (JP); Shoichi Seko, Aichi (JP)

(73) Assignee: Taiho Kogyo Co., Ltd., Toyota (JP)

( * ) Notice: Subject to any disclaimer, the term of this patent is extended or adjusted under 35 U.S.C. 154(b) by 60 days.

(21) Appl. No.: 10/088,487

(22) PCT Filed: Jul. 26, 2001

(86) PCT No.: PCT/JP01/06442

§ 371 (c)(1),
(2), (4) Date: Sep. 13, 2002

(87) PCT Pub. No.: WO02/10603

PCT Pub. Date: Feb. 7, 2002

(65) Prior Publication Data

US 2003/0059137 A1 Mar. 27, 2003

(30) Foreign Application Priority Data

Jul. 27, 2000 (JP) ........................................ 2000-227229

(51) Int. Cl.⁷ ............................................... F16C 33/10
(52) U.S. Cl. ........................ 384/276; 384/297; 384/907
(58) Field of Search .................................. 384/276, 280, 384/297, 322, 907, 907.1

(56) References Cited

U.S. PATENT DOCUMENTS

| 5,209,578 A | * | 5/1993 | Eastham et al. | ............. 384/276 |
| 6,305,847 B1 | * | 10/2001 | Tanaka et al. | ............... 384/297 |
| 6,609,830 B2 | * | 8/2003 | Bank et al. | ................. 384/276 |

FOREIGN PATENT DOCUMENTS

| JP | 53-46441 | 4/1978 |
| JP | 4-325697 | 11/1992 |
| JP | 9-71899 | 3/1997 |
| JP | 11-106779 | 4/1999 |

* cited by examiner

*Primary Examiner*—Thomas R. Hannon
(74) *Attorney, Agent, or Firm*—Armstrong, Kratz, Quintos, Hanson & Brooks, LLP

(57) ABSTRACT

In sliding bearing, wherein an overlay, which consists of at least one solid lubricant and a binder resin, covers an aluminum-alloy bearing layer bonded on backing metal, the overlay consists of an upper layer, which contains the solid lubricant essentially consisting of $MoS_2$, and a lower layer, which contains one or both of solid lubricant and hard additive. The solid lubricant of the lower layer is $MoS_2$ and its content is relatively lower than in the upper layer.

9 Claims, No Drawings

SLIDING BEARING

TECHNICAL FIELD

The present invention relates to a sliding bearing, more particularly to a sliding bearing for an internal combustion engine, which consists of an aluminum-alloy bearing layer pressure-bonded on the backing metal, and an overlay covering the aluminum-alloy bearing layer and consisting of a solid lubricant such as $MoS_2$ and a binder resin.

BACKGROUND TECHNIQUE

The present applicant has published the sliding bearing having the above-described type in Tribology Prepublished Lectures Tokyo, 1999–5 (May 10 through 12, 1999), A12. The aluminum bearing alloy used is Al-12.5Sn-2.7Si-1Cu-0.2Cr-2Pb. The solid lubricant used is $MoS_2$, graphite or h-BN. The binder used is epoxy resin and polyamide imide (PAI) and the like.

A preferable composition to improve the seizure resistance and the fatigue resistance of the $MoS_2$-PAI based overlay is from 30 to 95 mass % of $MoS_2$, the balance being PAI resin.

In the conventional overlay, an increase in the $MoS_2$ amount, which improves the initial conformability, is advisable to improve the seizure resistance. This method leads to reduction in the hardness of the overlay and hence to impair the wear resistance. The $MoS_2$-PAI-based overlay with much $MoS_2$ is likely to wear out, so that the underlying aluminum-alloy is exposed. As a result, bearing failure such as fatigue occurs. Contrary to this, an increase in the resin amount and hence an increase in the hardness is effective for improving the wear resistance. This incurs, however, an increase in the friction coefficient and hence an increase in the initial conformability. As is described hereinabove, the $MoS_2$-PAI based overlay with much $MoS_2$ can prevent the exposure of the underlying aluminum-alloy, but the seizure of the overlay and a shaft is liable to occur. It turned out that such contradictory phenomenon is prominent in a high-revolution type engine.

DISCLOSURE OF INVENTION

The conventional overlay has been designed in such a manner that a single layer attains good performance. The present inventors recognized that: only the top part of the overlay is required to exhibit initial conformability in a high-revolution type engine; the wear resistance of such part may be sacrificed and mild wear may be promoted; and after the conformable surface has been formed on the overlay, the conformability may be sacrificed in such a manner that the wear is suppressed and the low-friction coefficient property is realized over a long period of time. The present inventors have designed a multi-layer overlay, in which the respective functions are assigned to the respective layers. More specifically, the metallic overlay, such as a Pb overlay, which is the main trend, is manufactured by electro-plating and the like. Such a manufacturing method does not involve the concept of fundamental variation in the composition of an overlay. However, under the circumstance that the metallic overlay has been actually partly replaced with a resin-based overlay, a multi-layer can be easily prepared. The present inventors conceptualized that the functions of an overlay are separated in a multi-layer as described above. In addition, the fundamental function of the metallic overlay is to form a conformable surface. The fatigue resistance of the metallic overlay is inferior to that of the bearing alloy. In the academic paper mentioned above, it was elucidated that the fatigue resistance of the $MoS_2$-PAI based overlay is superior to that of the aluminum bearing-alloy. Thus, the present inventors arrived at a novel designing concept that the fatigue resistance is assigned to the overlay itself.

That is, the present invention is related to a sliding bearing, wherein an overlay, which consists of at least one solid lubricant and a binder resin, covers an aluminum-alloy bearing layer bonded on the backing metal, characterized in that said overlay consists of an upper layer, which contains the solid lubricant essentially consisting of $MoS_2$, and a lower layer consisting of one or both of at least one solid lubricant and at least one hard additive (hereinafter referred to as "the additive"), and, further, the $MoS_2$ gradually decreases without steps and the hard additive increases gradually in the direction from the top layer to the bottom layer. The present invention is hereinafter described in detail.

In the present invention, the backing metal is a low-carbon steel sheet, an alloy-steel sheet, and the surface-treated materials of the sheets. The backing metal is metallic material, which can support the aluminum bearing-alloy usually referred to as the lining, and on which the lining is pressure-bonded.

The aluminum-bearing alloy is an Al—Sn based alloy, particularly Al-3~15 mass % Sn based alloy. Evidently, up to 4 % of the components for enhancing the wear resistance and fatigue resistance, such as Si, Cr, Cu, Mg, In, Zr, Pb and the like, may be added to the alloy component of the aluminum bearing alloy mentioned above. However, since the bearing performance of the overlay is improved in the present invention, the additive components are not essential.

The upper layer of the overlay contains a solid lubricant consisting of $MoS_2$, which exhibits excellent initial conformability. Its content is preferably from 40 to 95 mass %, more preferably from 50 to 80 mass %. A small amount of a solid lubricant other than $MoS_2$ may be used in combination.

The lower layer contains one or both of the solid lubricants or the hard additives (additives). The amount of the additives is preferably from 30 to 85 mass %, more preferably from 30 to 60 mass %. When the solid lubricant consists only of $MoS_2$ or is a combination of $MoS_2$ and other component(s), the content of $MoS_2$ in the lower layer should be relatively lower than that in the upper layer. The $MoS_2$ content of the upper layer is higher than that of the lower layer by preferably 10% or more, more preferably by 15 to 20%.

The solid lubricant of the lower layer may be graphite, zinc sulfide, tungsten disulfide and/or hexagonal boron nitride which replaces $MoS_2$ or is added in addition to $MoS_2$.

The hard additive is specifically at least one selected from the group consisting of $Si_3N_4$, $SiO_2$, SiC and $Al_2O_3$. The content is preferably from 0.1 to 10 mass %, more preferably from 1 to 5 mass %.

In the present invention, the components and composition of the upper and lower layers are constant in the respective layer. If necessary, the upper layer may be embodied as two or more sub-layers having different $MoS_2$ content. The $MoS_2$ content of the upper sub-layer is greater than that of the lower sub-layer, thereby forming a concentration gradient. In this embodiment, the initial conformability of the upper layer is attained at a furthermore higher level. Likewise, the lower layer may be embodied as two or more sub-layers having different content of the additive. The additive content of the upper sub-layer is greater than that of the lower sub-layer, thereby forming a concentration gradient. In this embodiment, the wear resistance of the lower layer can be realized for an extended sliding distance. The upper layer having the concentration gradient as described above has a higher average $MoS_2$ content than the average $MoS_2$ content of the lower layer. More preferably, the gradient of $MoS_2$ concentration is established in the entire overlay. The particle diameter of the additive is not particularly limited, but the average diameter is preferably in the range of from 0.1 to 2 μm.

The binder resin preferably used is polyamide imide.

The overlay according to the present invention may be an inclined layer structure consisting of an upper layer, an intermediate layer and a lower layer. The intermediate layer has the identical component as that of either of the upper layer having a single composition or the lower layer having a single composition. In addition, the composition of the upper and lower layers may not be distinctly differentiated. That is, not stepwise but gradual decrease of $MoS_2$ and increase of hard additive from the upper and lower layers may be carried out. No adherence problem between the upper and lower layer occurs, so that stable initial conformability and wear resistance can be attained.

The overlay is preferably from 2 to 15 μm thick, more preferably from 3 to 9 μm thick. The upper layer is preferably from 1 to 5 μm thick, more preferably from 2 to 4 μm thick.

The upper and lower layers according to the present invention can be prepared by means of applying on the cleaned surface of aluminum-alloy the resin, which contains a predetermined additive, and subsequently curing at 180 to 270° C. That is, neither special surface treatment nor polishing is carried out after the curing.

The present invention is hereinafter described with reference to Examples and Comparative Examples.

BEST MODE FOR CARRYING OUT THE INVENTION

The upper layer (2 μm of thickness), the intermediate layer (1 μm of thickness), and the lower layer (4 μm of thickness) having the compositions shown in Table 1 were formed on the aluminum-bearing alloy (composition—Al—Sn based). The aluminum alloy was pressure-bonded on a low-carbon steel sheet by a conventional method. The balance of the additive is polyamide imide. The sliding bearings produced as described above were subjected to the seizure-resistant test and wear-resistant test described below.

Seizure Resistant Test

Tester: high surface-pressure bearing tester
Opposed shaft: S55C (quenching hardened)
Lubrication: oil-supply to a shaft
Method for imparting load: successive increase Wear Resistant Test Tester: rotary load tester
Opposed shaft: S55C (quenching hardened)
Lubrication: oil-supply into a shaft
Load: static load
The results of the test are shown in Table 1.

TABLE 1

| Upper Layer | Intermediate Layer | | Lower Layer | | Results | | |
| --- | --- | --- | --- | --- | --- | --- | --- |
| $MoS_2$ | $MoS_2$ | Hard Matter | $MoS_2$ | Hard Additive | Seizure Surface Pressure | Wear Amount | Remarks |
| 55% | 55% | 1% $Si_3N_4$ | 40% | 1% $Si_3N_4$ | 75 MPa | 1 μm | Example 1 |
| ↑ | ↑ | 3% $Si_3N_4$ | ↑ | 3% $Si_3N_4$ | 75 MPa | 1 μm | Example 2 |
| 70% | 70% | 1% $Si_3N_4$ | 40% | 1% $Si_3N_4$ | 80 MPa | 3 μm | Example 3 |
| ↑ | ↑ | ↑ | 30% | ↑ | 80 MPa | 2 μm | Example 4 |
| ↑ | ↑ | 1% BN | ↑ | 1% BN | 80 MPa | 2 μm | Example 5 |
| ↑ | ↑ | 1% ZnS | ↑ | 1% ZnS | 80 MPa | 2 μm | Example 6 |
| | | 40% $MoS_2$ | | | 60 MPa | 1 μm | Comparative Material (Single Layer) |
| | | 70% $MoS_2$ | | | 55 MPa | 5 μm | Comparative Material (Single Layer) |

Industrial Applicability

As is described hereinabove, the overlay consists of an upper layer and a lower layer. Importance is attached to the upper layer with regard to the conformability. Importance is attached to the lower layer with regard to the wear resistance. As a result, the seizure resistance can be increased, while the wear resistance can be kept to a low level.

What is claimed is:

1. A sliding bearing comprising an overlay, consisting of at least one solid lubricant and a binder resin, said overlay covers an aluminum-alloy bearing layer bonded on backing metal, and said overlay consists of an upper layer comprising said solid lubricant consisting essentially of $MoS_2$, and a lower layer, consisting of one or both of at least one solid lubricant and at least one hard additive, wherein when said solid lubricant of said lower layer is $MoS_2$, its content is relatively lower than that of said upper layer.

2. A sliding bearing according to claim 1, wherein the $MoS_2$ content of the upper layer is from 40 to 95 mass %.

3. A sliding bearing according to claim 2, wherein the content of the solid lubricant and hard additive of said lower layer is from 30 to 85 mass %.

4. A sliding bearing according to claim 3, wherein said lower layer contains only the solid lubricant.

5. A sliding bearing according to claim 4, wherein said solid lubricant is $MoS_2$.

6. A sliding bearing according to claim 5, wherein the $MoS_2$ content of said upper layer is more than the $MoS_2$ content of said lower layer by 10 mass % or more.

7. A sliding bearing according to any one of claims 1 through 6, wherein the hard additive of said lower layer is at least one selected from the group consisting of $Si_2N_4$, $SiO_2$, SiC and $Al_2O_3$.

8. A sliding bearing according to any one of claims 1 through 6, wherein said upper layer consists of two or more sub-layers having different $MoS_2$ content of the upper sub-layer is more than the $MoS_2$ content of the lower sub-layer.

9. A sliding bearing according to anyone of claims 1 through 6, wherein said lower layer consists of two or more sub-layers having different additive amount.

* * * * *